Patented Oct. 8, 1946

2,408,798

UNITED STATES PATENT OFFICE 2,408,798

ALKYLATION OF MIXED OLEFINS

Richard N. Meinert, Westfield, N. J., assignor to Standard Oil Development Company, a corporation of Delaware No Drawing. Application August 4, 1943, Serial No. 497,390

9 Claims. (Cl. 260—683.4)

The present invention relates to improvements in the preparation of aviation fuel blending agents, and in particular it relates to the preparation of aviation fuel blending agents having balanced volatility characteristics by the alkylation of mixtures of olefins containing ethylene and higher olefins with isoparaffins.

Heretofore it was a matter of record to alkyate $C_3$, $C_4$, and $C_5$ olefins with isobutane in the presence of a catalyst such as $H_2SO_4$ or HF. However, ethylene could not be alkylated by these catalysts under the conditions used in alkylating $C_3$—$C_5$ olefins, and in any case yields were very low and the product was of poor quality. Before my invention others had alkylated ethylene and higher olefins with isobutane employing an aluminum halide hydrocarbon complex formed by contacting aluminum chloride with a mixture of isobutane and an olefin, in the absence or the presence of an alkyl halide promoter, whereupon a brownish mobile liquid was formed. This complex was found to be an active catalyst for converting the olefins to branched chain paraffin hydrocarbons by alkylating them with isobutane or isopentane. The branched chain paraffinic hydrocarbons produced in the alkylation were found to have an excellent octane number, and to be valuable blending agents in the manufacture of aviation fuel.

The processes as practiced before my invention suffered from the disadvantage that each of the olefins from $C_2H_4$ to $C_5H_{10}$, when alkylated individually, had an optimum reaction temperature which increased progressively with derceasing number of carbon atoms in the olefin molecule. Thus the best yields and product qualities in alkylating butylene are obtained at temperatures of about 40–50° F. In the case of propylene, the optimum temperature is about 60–80° F., while in the case of ethylene the optimum alkylating conditions require a temperature of about 110–150° F. The alkylation of butylenes, for example at 115° F. resulted in low yields and a product having a lower octane number than the product obtained when alkylating butylenes at 45° F. It was customary therefore to separate the olefins present in refinery gases into at least two fractions, one containing ethylene and some propylene and the other containing butylene together with some propylene, separately alkylate the two olefin streams, and blend the products, together with an aviation base stock. This involved a costly distillation step and required two alkylation plants.

I have now found that instead of separately alkylating the ethylene and the higher olefins at the optimum temperature for each, I can alkylate the entire olefin mixture present in refinery gases by carrying out the reaction at the temperature which is optimum for the olefin which is most difficult to alkylate. Thus in alkylating an olefin mixture containing ethylene, the reaction is carried out at about 130° F., which is approximately the optimum condition for alkylating ethylene. To alkylate a mixture of propylene and butylenes, the reaction is carried out at about 70° F., which is the optimum temperature for alkylating propylene. Under these conditions the resulting mixed alkylate is of equal or higher quality than would be obtained if each olefin were separately alkylated under its optimum condition of temperature, and the alkylates subsequently blended. Moreover, the product resulting from the alkylation of the mixed olefins is of considerably better quality than is obtained if the olefins are alkylated separately each at the same temperature employed in alkylating the mixture, namely at the temperature which is optimum for the olefin which is most difficult to alkylate.

It is an object of my invention to alkylate a mixture of olefins with an isoparaffin to obtain an aviation fuel blending agent having a balanced volatility and uniformly high octane number throughout its boiling range in a manner which is cheaper and requires less equipment than was heretofore possible.

It is a further object of my invention to alkylate olefin mixtures containing ethylene to produce an aviation fuel blending agent containing predominantly low boiling $C_6$ branched paraffins, especially 2,3-dimethylbutane, and higher boiling trimethylpentanes, both of which have high octane number ratings, thereby obtaining in one operation a fuel having balanced volatility and octane number characteristics.

It is a still further object of my invention to alkylate olefin mixtures containing ethylene and at least one other olefin from $C_3$ to $C_5$ under conditions such that the resulting mixed alkylate product is equal to or better in quality than would be obtained by alkylating each olefin separately under conditions optimum for that particular olefin.

Other and further objects of my invention will appear from the following more detailed description and claims.

The alkylation reaction may be carried out by contacting a mixture of the olefins and isoparaffin in a proportion of at least two mols of isoparaffin per mol of olefin with an aluminum halide-hydrocarbon complex. The catalyst is conveniently prepared by charging the reactor with isobutane and aluminum chloride and agitating said mixture while admitting the olefin feed. A promoter such as methyl or ethyl chloride may be added to facilitate the formation of the catalyst complex. Agitation may be secured by any well known means such as a turbomixer type stirrer, circulating the liquid through a jet by means of a recirculating pump, etc. The product withdrawn from the reactor is passed to a settler from which catalyst may be withdrawn or returned to the reactor, while the liquid product is stabilized and rerun. Unreacted isobutane in the product may be returned to the reactor along with sufficient fresh olefin and isobutane feed to give the desired isoparaffin to olefin ratio in the reaction zone.

Since the alkylation process generally is well known to the art and is in extensive use in the petroleum refining industry, the above description is sufficient to enable one familiar with the art to carry out the process of my invention. I have therefore not attempted to include all the various refinements and procedural steps that would be employed in a commercial plant since it is my object to direct attention to the main concept embodying my present invention.

The following examples will serve to illustrate the conditions and advantages of my invention. They are merely for illustration and are not intended to limit the scope of the invention, which is clearly defined in the claims.

EXAMPLE 1 (a)

A mixture of 10 gram mols of ethylene, 2.3 gram mols of butylenes and 6.9 mols of n-butane was added during the course of one hour to a well stirred mixture of 37 gram mols of isobutane to which had been added 5 volume per cent of ethyl chloride, and an $AlCl_3$ complex catalyst which had been prepared by stirring 1.25 lbs. of $AlCl_3$ with isobutane containing 5% ethyl chloride while slowly bleeding in ethylene until the $AlCl_3$-hydrocarbon complex formed a dark reddish brown mobile liquid. During the alkylation reaction the temperature was maintained at 115° F. and the pressure was maintained high enough to maintain substantially completely liquid phase in the reactor. The reaction mixture was stirred for about 15 minutes after addition of the olefin was completed. The mixture was then allowed to settle and the hydrocarbon layer was drawn off and distilled into fractions. The results obtained are tabulated in Table I, column A.

EXAMPLES 1 (b, c, d)

The feed stocks and conditions used were the same as in Example 1 (a) and the results are shown in Table I, columns B, C, and D.

EXAMPLE 1 (e)

Thirteen gram mols of ethylene were added during the course of 1.3 hours to a well stirred mixture of 39 gram mols of isobutane containing 5% of ethyl chloride promoter and the same catalyst as used in the previous example. The results and reaction conditions are tabulated in Table I, column E.

EXAMPLE 1 (f)

An olefin feed containing 10 gram mols of butylenes and 30 mols of normal butane was added during one hour to a well stirred mixture of 30 mols of isobutane containing 5% of ethyl chloride and the same catalyst as used in the previous examples maintained at 115° F. The results are shown in Table I, column F.

EXAMPLE 1 (g)

The same feed stock and procedure was used as in Example 1 (f), except that the temperature was maintained at 47° F. The reaction conditions and results are given in Table I, column G.

TABLE I

*Alkylation of olefins with isobutane $AlCl_3$-hydrocarbon complex catalyst*

| | Column | | | | | | |
|---|---|---|---|---|---|---|---|
| | A | B | C | D | E | F | G |
| Feed, gram mols: | | | | | | | |
| Isobutane | 37 | 37 | 37 | 37 | 39 | 30 | 30 |
| Ethylene | 10 | 10 | 10 | 10 | 13 | | |
| Butylenes | 2.3 | 2.3 | 2.3 | 2.3 | | 10 | 10 |
| N-butane | 6.9 | 6.9 | 6.9 | 6.9 | | 30 | 30 |
| Ethyl chloride, vol. per cent on iso $C_4H_{10}$ | 5 | 5 | 5 | 5 | 5 | 5 | 5 |
| Reaction temperature, °F | 115 | 115 | 115 | 115 | 115 | 115 | 47 |
| Total alkylate yield, wt. per cent on olefin | 258 | 258 | 255 | 244 | 290 | 195 | 181 |
| Vol. per cent: | | | | | | | |
| $C_5$ | 3 | 4 | 4 | 2 | 5 | 9 | 0 |
| $C_6$ | 65 | 64 | 62 | 63 | 72 | 13 | 1 |
| $C_7$ | 5 | 6 | 5 | 7 | 4 | 14 | 11 |
| $C_8$ | 22 | 21 | 22 | 20 | 11 | 46 | 71 |
| $C_{9+}$ | 5 | 5 | 7 | 8 | 8 | 18 | 17 |
| ASTM octane number of aviation cut ($C_5$-$C_8$) | | 93.2 | | | 92.8 | 91.8 | 95.7 |

Referring to Table I, it will be noted that when alkylating butylenes alone under optimum conditions (47° F.) the aviation cut had an ASTM octane number of 95.7, whereas when butylenes were alkylated alone at 115° F., the aviation cut had an octane number of only 91.8. When ethylene was alkylated at 115° F. (approximately the optimum temperature) the product aviation cut had an octane number of 92.8.

Moreover, the alkylate product from the mixed feed contains about 64% of $C_6$ hydrocarbons, which gives a better volatility balance than the products obtained by alkylating either of the olefins separately. It will be noted also in Table I that there is less heavy bottoms boiling outside the aviation fuel range ($C_{9+}$) when ethylene and butylenes are alkylated together than are formed with butylene feed only. Hence the mixed ethylene-butylene feed is superior from the standpoint of economy in producing aviation gasoline.

EXAMPLE II (a)

A mixture of 12 gram mols of ethylene, 2 gram mols of propylene and 6 gram mols of propane (ethylene-propylene ratio, 6/1) was added during the course of one hour to a well stirred mixture of 42 gram mols of isobutane to which had been added 5 volume per cent ethyl chloride promoter and $AlCl_3$ complex catalyst prepared as in Example I (a). During the alkylation reaction, the temperature was maintained at 115° F. and the pressure was maintained sufficiently high to maintain the hydrocarbons substantially completely in the liquid phase. The reaction mixture was stirred for about 15 minutes after addition of the olefin was completed. The mixture was then allowed to settle and the hydrocarbon layer was drawn off and distilled into fractions. The results obtained are tabulated in Table II, Column A.

EXAMPLE II (b)

A mixture of 10 mols of ethylene, 5 mols of propylene, and 15 mols of propane (ethylene/propylene ratio, 2/1) was added during the course of one hour to a well stirred mixture of 45 mols of isobutane and an AlCl₃-hydrocarbon catalyst under the same conditions as in Example II (a). The results and reaction conditions are given in Table II, column B.

EXAMPLE II (c)

Eight mols of ethylene, 8 mols of propylene, and 24 mols propane (ethylene/propylene ratio, 1/1) were added over a period of one hour to a mixture of 48 mols of isobutane and AlCl₃-hydrocarbon catalyst as in Example II (a). Reaction conditions and method of working up reaction products were the same as in Examples II (a) and II (b). Results are tabulated in Table II, column C.

EXAMPLE II (d)

Thirteen mols of ethylene were added over a period of one hour to a well stirred mixture of 39 mols of isobutane and the same AlCl₃-hydrocarbon catalyst used in Example II (a). Results are tabulated in Table II, column D.

EXAMPLE II (e)

Thirteen mols of pure propylene were added during the course of one hour to a well stirred mixture of 39 mols of isobutane and AlCl₃-hydrocarbon catalyst under the same conditions specified in Example II (a). Results are given in Table II, column E.

EXAMPLE II (f)

Fifteen and one-half mols of propylene were added during the course of one hour to a well stirred mixture of 46.3 mols of isobutane and an AlCl₃-hydrocarbon complex catalyst as previously described. Reaction conditions were the same as in Example II (e), except that the temperature was 70° F. and the volume per cent of ethyl chloride added to the isobutane was ½ of 1%. Results on this run are given in Table II, column F.

TABLE II

*Alkylation of olefins with isobutane AlCl₃-hydrocarbon complex catalyst*

|  | Column |  |  |  |  |  |
|---|---|---|---|---|---|---|
|  | A | B | C | D | E | F |
| Feed, gram mols: |  |  |  |  |  |  |
| Isobutane | 42 | 45 | 48 | 39 | 39 | 46.3 |
| Ethylene | 12 | 10 | 8 | 13 |  |  |
| Propylene | 2 | 5 | 8 |  | 13 | 15.5 |
| Propane | 6 | 15 | 24 |  |  |  |
| Ethyl chloride, vol. percent on iso C₄H₁₀ | 5 | 5 | 5 | 5 | 5 | ½ |
| Reaction temperature, °F | 115 | 115 | 115 | 115 | 115 | 70 |
| Total alkylate yield, wt. percent on olefin | 254 | 223 | 232 | 262 | 252 | 206 |
| Volume percent: |  |  |  |  |  |  |
| C₅ hydrocarbons | 4 | 3 | 1 | 2 | 11 | 0 |
| C₆ hydrocarbons | 65 | 53 | 43 | 76 | 10 | 1 |
| C₇ hydrocarbons | 13 | 28 | 37 | 6 | 52 | 68 |
| C₈ hydrocarbons | 9 | 6 | 6 | 16 | 12 | 2 |
| C₉₊ hydrocarbons | 9 | 10 | 13 |  | 15 | 29 |
| ASTM octane No. of aviation cut (C₅–C₈) | 93.8 | 92.3 | 92.1 | 93.5 | 81.1 | 88.1 |

Referring to Table II, it will be noted that the aviation gasoline fraction obtained when alkylating propylene alone at a temperature of 70° F. was 88.1, whereas when propylene was alkylated alone at 115° F. the aviation cut had an octane number of only 81.1. When ethylene was alkylated at 115° F. (approximately the optimum temperature for ethylene alkylation), the aviation fraction produced had an octane number of 93.5.

When the mixture of ethylene and propylene was alkylated together at the optimum temperature for ethylene alkylation (approximately 115° F.) the resulting aviation gasoline had an octane number ranging from 92.1 to 93.8, depending upon the ethylene to propylene mol ratio. In other words, the octane number of the product obtained by alkylating the mixed olefins at 115° F. is considerably higher than would have been obtained by blending the alkylates produced by alkylating each olefin separately at 115° F. and is higher than would be obtained by alkylating separately the ethylene at its optimum temperature (approximately 115° F.) and alkylating separately the propylene at its optimum alkylation temperature approximately 70° F.), and blending the products from the two separate alkylations. Moreover, the alkylate product produced by the mixed feed is a better balanced aviation gasoline from the standpoint of volatility than either of the gasolines produced by alkylating the olefin separately; for example, in column C, Table II, it is shown that the total alkylate contains 43% of C₆ and 37% of C₇ paraffins when alkylating an equal molar mixture of ethylene and propylene as compared to 76% of C₆ and 6% of C₇ paraffins obtained when alkylating ethylene alone (column D of Table II) or as compared with 1% of C₆ and 68% of C₇ paraffins obtained when alkylating propylene alone at 70° F. column F, Table II). It will also be noted in Table II that considerably less heavy bottoms boiling outside the aviation gasoline range (C₉₊ hydrocarbons) are formed when alkylating the mixed ethylene-propylene feed than are obtained by alkylating propylene alone at 70° F., which is the temperature at which the best octane numbers are obtained in propylene alkylation. Hence, the mixed ethylene-propylene feed is superior from the standpoint of economy in producing aviation gasoline.

The foregoing examples show an operating temperature of 115° F. I have found that the optimum results are obtained somewhere in the temperature range 115–130° F. with good results being obtained in the range 100–150° F. It is also desirable to operate the system under pressure and therefore I generally employ from 200–275 lbs. per square inch gauge, although good results may be obtained at pressures outside of this range, for example 50–350 lbs. per square inch gauge.

As is usual in alkylation reactions, it is preferable to maintain an excess of isoparaffin over olefin in the reaction zone, preferably at least 2 mols of isoparaffin to mol of olefin. Even better results are obtained, however, at isoparaffin to olefin ratios in the range of 3/1 to 10/1 or higher.

In the foregoing examples I have shown runs made with ethylene and butylene and with ethylene and propylene. I may, however, use mixtures containing propylene and butylene; propylene, butylene and penenes; ethylene, propylene, and butylene, or mixtures containing all olefins containing from 2 up to 5 carbon atoms. To recapitulate briefly, I have found that a mixture of olefins can be alkylated under the conditions, particularly of temperature, which are required for the olefin most difficult to alkylate, with excellent results. Under these conditions each olefin behaves as though it were being alkylated at the temperature best suited to produce a high octane number aviation alkylate if each olefin were alkylated separately, and the resulting mixed alkylate is produced in better yield and quality, particularly the ASTM octane rating as indicated by the preceding data, than would be obtained if the individual olefins were alkylated separately under the given conditions.

Numerous modifications of my invention will occur to those who are familiar with this art. What I claim to have invented and desire to cover by Letters Patent is:

1. A process for alkylating an isoparaffin with a mixture of different olefins which comprises adding the mixed olefin feed to a mixture of isoparaffin and an AlCl₃-hydrocarbon complex catalyst prepared by agitating, prior to the alkylation reaction proper, a suspension of AlCl₃ in an isoparaffin while adding an olefin in small increments until a dark reddish brown mobile liquid catalyst consisting of an aluminum chloride-hydrocarbon complex catalyst is formed, and maintaining alkylating conditions of temperature and pressure which are optimum for that component of said mixture of olefins which is the most difficult to alkylate.

2. A process of alkylating a mixture of propylene and at least one other olefin having 4-5 carbon atoms with an isoparaffin which comprises adding the mixed propylene-olefin feed to a mixture of isoparaffin and an AlCl₃-hydrocarbon complex catalyst prepared by agitating, prior to the alkylation reaction proper, a suspension of AlCl₃ in an isoparaffin while adding an olefin in small increments until a dark reddish brown mobile liquid catalyst consisting of an aluminum chloride-hydrocarbon complex catalyst is formed, and maintaining alkylating conditions of temperature and pressure most suitable for the alkylation of propylene.

3. The process set forth in claim 1 in which in the preparation of the catalyst isobutane is used as the isoparaffin and ethylene as the olefin.

4. A process for alkylating an isoparaffin with a mixture of ethylene and at least one other olefin containing from 3-5 carbon atoms under the conditions of temperature and pressure which are most suitable for the alkylation of ethylene and in the presence of an aluminum chloride-hydrocarbon complex catalyst prepared, prior to the alkylation of said ethylene-olefin mixture, by agitating a suspension of aluminum chloride in an isoparaffin while adding olefin in small increments until a dark reddish brown mobile liquid catalyst consisting of an aluminum chloride-hydrocarbon complex catalyst is formed.

5. The process set forth in claim 1 in which the alkylation is carried out under temperature conditions most favorable for the olefin requiring the highest temperature.

6. The process set forth in claim 1 in which a promoter such as methyl chloride or ethyl chloride is added to the isoparaffin used in making the catalyst and in carrying out the alkylation reaction.

7. The process set forth in claim 4 in which the temperature is between about 110–150° F. and the pressure is between about 100–300 lbs. per square inch gauge.

8. The process set forth in claim 2 in which the temperature is between about 65–85° F.

9. A process for the alkylation of a mixed olefin feed containing both ethylene and butylene with isobutane consisting of adding the mixed olefin feed to a well agitated mixture of isobutane and an AlCl₃-hydrocarbon complex catalyst prepared by agitating, prior to the alkylation reaction proper, a suspension of AlCl₃ in isobutane while adding an olefin in small increments in the presence of an akyl halide promoter, until a dark reddish brown mobile liquid catalyst consisting of an aluminum chloride-hydrocarbon complex catalyst is formed the alkylation reaction being conducted at a temperature of 115° F. under pressure of 275 lbs. per square inch, separating the hydrocarbon layer from the catalyst layer and distilling the hydrocarbon layer to obtain a fraction suitable for use as an aviation fuel blending agent.

RICHARD N. MEINERT.